April 9, 1929.  C. C. CHILDRESS  1,708,119
RAT TRAP
Filed July 13, 1928    2 Sheets-Sheet 1

Inventor
Christopher C. Childress
By Victor J. Evans
Attorney

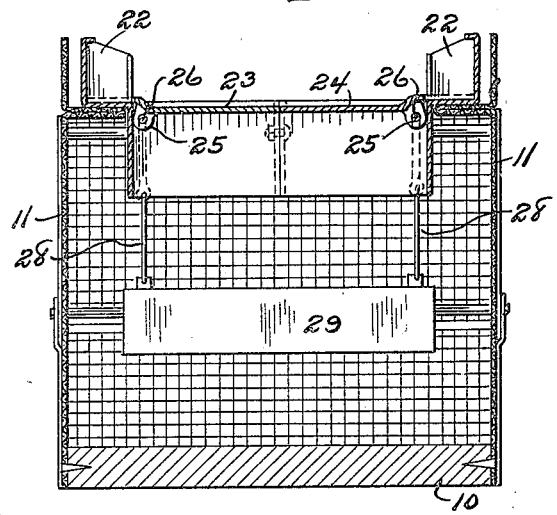
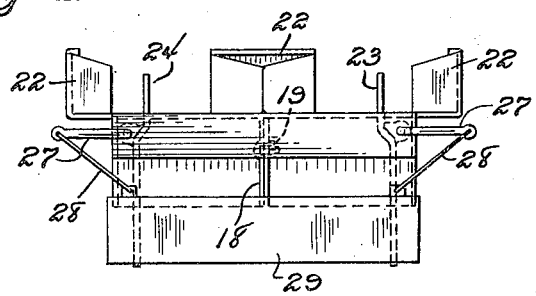
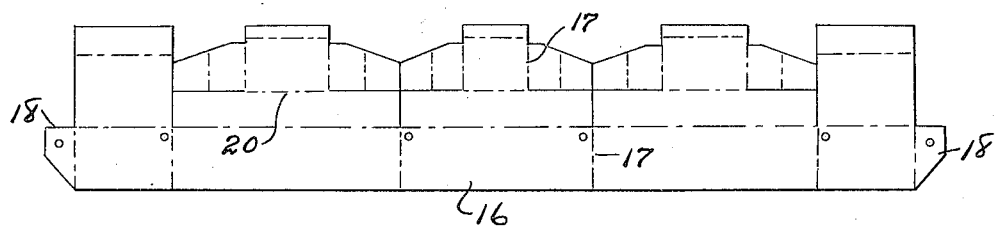

Patented Apr. 9, 1929.

1,708,119

UNITED STATES PATENT OFFICE.

CHRISTOPHER C. CHILDRESS, OF VENUS, TEXAS.

RAT TRAP.

Application filed July 13, 1928. Serial No. 292,572.

This invention contemplates the provision of a rat trap including a pair of pivoted platforms arranged at the top of a receptacle, between a group of bait holders, so that the rat when stepping upon either platform to obtain the bait, will fall into the receptacle and be trapped therein.

In carrying out the present invention I contemplate a novel construction of platform support and bait holders which is stamped from a single blank of material and designed to be conveniently attached to the body of the trap.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 3 is a sectional view on line 3—3 of Figure 1.

Figure 4 is an end elevation of the platform support and bait holders.

Figure 5 is a view of the blank from which the platform support and bait holders are formed.

Figure 1:
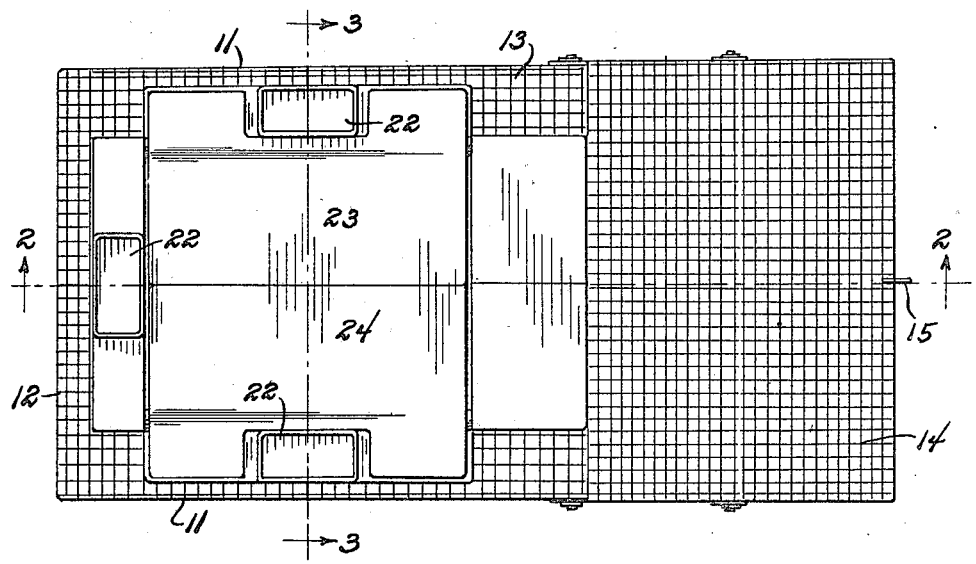
Figure 1 is a top plan view of the trap.
Figure 2:
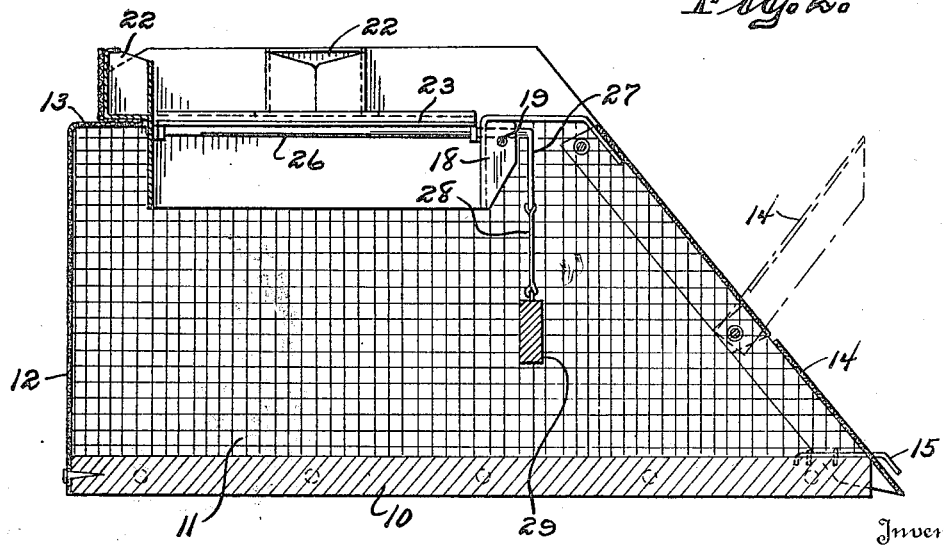
Figure 2 is a sectional view on line 2—2 of Figure 1.

Referring to the drawings in detail 10 indicates the bottom of a receptacle, the body portion of which is preferably formed of foraminated material, and includes opposed sides 11, the rear end wall 12, top 13 and a downwardly inclined front wall as illustrated in Figures 1 and 2. The front wall constitutes a runway for the rat to reach the top of the receptacle in an attempt to obtain the bait which is supported thereon in a manner to be hereinafter described. The front wall includes a pivoted section 14 which is used as a closure for the trap which is normally held closed by a suitable latch 15, but which can be conveniently opened to empty the trap when desired. The top wall 13 is provided with a large opening to accommodate the combined platform support and bait holder to be presently described.

This part of the invention is formed from a single blank of material indicated at 16 in Figure 5 which is folded upon itself along the lines 17 to provide a substantially rectangular frame, while the free ends are formed with apertured ears 18 adapted to be arranged in parallel relation to receive a fastening element 19 utilized to hold the blank in frame-like formation. The body of the frame is received by the opening in the top wall of the trap and is clearly illustrated in Figure 3, while each side of the frame is bent along the line 20 to provide a lateral extension which reposes upon the top wall as clearly illustrated in Figures 2 and 3. Each lateral extension is slit along the dot and dash lines so that it may be bent to provide a bait holder at opposite sides and one end of the frame as clearly illustrated in Figure 1. Each bait holder is also substantially of rectangular contour in plan and defines a container or holder for the bait, each container being open at its top. As clearly illustrated in the drawings these bait holders 22 are grouped about the pivoted platforms 23 and 24 respectively, the platforms being provided with apertured lugs 25 which are secured to pivoted rods or shafts 26. Each of these pivot rods 26 is provided with a right angularly disposed extension 27 which affords each rod a substantially L-shaped contour, and these extensions 27 have suspended therefrom links 28 which support a suitable weight 29 which normally maintain the platforms in the position illustrated in Figures 1 and 3. However, when either or both of the platforms are occupied by a rat seeking to obtain the bait from any of the holders 22, the platforms will move downwardly upon their pivots thereby depositing the rat within the receptacle in which it is trapped. During this movement of the platforms, the weight is elevated as illustrated in Figure 4 with the links 28 assuming the positions illustrated in this figure. Just as soon as the platforms are released from the weights of the rat, the weight 29 automatically returns the platforms to their normal positions. The invention can be cheaply manufactured and sold at a nominal cost, and at the same time is constructed substantially with a minimum of parts.

While it is believed that from the foregoing description the nature and advantages of the invention will be readily understood, I desire to have it known that I do not limit myself to what is herein shown and described and that such changes may be resorted to when desired as fall within the scope of what is claimed.

What is claimed is:

1. A rat trap comprising a receptacle having an opening in the top thereof and a downwardly inclined wall, a combined platform support and bait holder formed from a single blank of material, and including a substantially frame-like body portion adapted to be fitted within said opening, extensions projecting laterally from three sides of the frame and bent upon themselves to provide containers for the reception of bait, platforms pivoted on the body portion of the frame and normally closing said opening, and a weight suspended from said platforms for holding the latter in their normal positions.

2. A rat trap comprising a receptacle having an opening in the top thereof, an inclined wall constituting a runway, said wall including a pivoted section constituting a door for the trap, a latch for normally holding the door closed, a combined platform support and bait holder formed from a single blank of material bent upon itself to provide a substantially rectangular frame, the body portion of which is adapted to be fitted in said opening, extensions projecting laterally from three sides of the frame and slit along predetermined lines whereby each extension is bent to form a bait receiving container, means for connecting the free ends of the blank together and holding the same in frame-like formation, platforms pivoted on the body of the frame and normally closing said opening, and a weight suspended from said platforms for holding the latter in their normal positions.

In testimony whereof I affix my signature.

CHRISTOPHER C. CHILDRESS.